(12) United States Patent
Yamamoto (10) Patent No.: US 8,715,542 B2
(45) Date of Patent: May 6, 2014

(54) METHOD OF MANUFACTURING OPTICAL WAVEGUIDE

(75) Inventor: Takanori Yamamoto, Nagano (JP)

(73) Assignee: Shinko Electric Industries Co., Ltd., Nagano-shi (JP)

( * ) Notice: Subject to any disclaimer, the term of this patent is extended or adjusted under 35 U.S.C. 154(b) by 394 days.

(21) Appl. No.: 12/607,417

(22) Filed: Oct. 28, 2009

(65) Prior Publication Data

US 2010/0109173 A1 May 6, 2010

(30) Foreign Application Priority Data

Oct. 31, 2008 (JP) ................................. 2008-281463

(51) Int. Cl.
 *B24B 1/00* (2006.01)
(52) U.S. Cl.
 USPC .............................. 264/2.7; 264/1.1; 264/139
(58) Field of Classification Search
 USPC .................... 264/1.1, 1.24, 2.7, 139
 See application file for complete search history.

(56) References Cited

U.S. PATENT DOCUMENTS

| 4,866,847 | A | * | 9/1989 | Batrack et al. ................. 30/293 |
| 5,572,619 | A | | 11/1996 | Maruo |
| 5,598,501 | A | | 1/1997 | Maruo |
| 5,999,670 | A | | 12/1999 | Yoshimura |
| 6,947,645 | B2 | | 9/2005 | Korenaga |
| 7,163,598 | B2 | | 1/2007 | Okubora et al. |
| 7,306,689 | B2 | | 12/2007 | Okubora et al. |
| 2006/0133764 | A1 | | 6/2006 | Okubora et al. |

FOREIGN PATENT DOCUMENTS

| JP | 7-92338 | 4/1995 |
| JP | 7-294748 | 11/1995 |
| JP | 10-300961 | 11/1998 |
| JP | 2000-199827 | 7/2000 |
| JP | 2003-167175 A1 | 6/2003 |
| JP | 2003-215370 | 7/2003 |
| JP | 2000-171641 | 6/2006 |
| JP | 2006-171641 | 6/2006 |

OTHER PUBLICATIONS

Bockstaele et al., "Microcavity LED-based parallel data link using small-diameter (125 micrometer) plastic optical fibers", 1999, J. Opt. A: Pure Appl. Opt. 1 233-236.*
Machine English Translation of JP 7-294748 published on Nov. 10, 1995.
Japanese office action mailed Sep. 4, 2012, in counterpart Japanese Application No. 2008-281463, with English Translation.
Japanese office action mailed Jun. 5, 2012, in counterpart Japanese Application No. 2008-281463, with English Translation.

* cited by examiner

*Primary Examiner* — Galen Hauth
(74) *Attorney, Agent, or Firm* — Kratz, Quintos & Hanson, LLP (57) ABSTRACT

An optical waveguide is cut by moving a heated knife blade across the optical waveguide with the knife blade maintained at a predetermined angle. At that time, by maintaining the temperature of the knife blade at a temperature not lower than the glass transition point of the optical waveguide, a portion, in contact with a bevel plane of the knife blade, of the optical waveguide softens to be planarized along the bevel plane. In this way, an optical path conversion mirror constituted of a planarized cut plane is formed in a region through which the bevel plane has passed.

5 Claims, 9 Drawing Sheets

FIG. 13

METHOD OF MANUFACTURING OPTICAL WAVEGUIDE

CROSS-REFERENCE TO RELATED APPLICATIONS

This application is based on and claims priority of Japanese Patent Application No. 2008-281463 filed on Oct. 31, 2008, the entire contents of which are incorporated herein by reference.

BACKGROUND OF THE INVENTION (a) Field of the Invention

The present invention relates to a technology for manufacturing an optical waveguide. More specifically, it relates to a method of manufacturing an optical waveguide which has an end face (optical path conversion mirror) for changing an optical path in a predetermined direction and which is adapted to be mounted on a wiring board or the like.

(b) Description of the Related Art

In recent multilayer wiring boards on which higher-density mounting is demanded, the mounting of optical waveguides thereon is being increasingly employed as one technique for solving problems such as crosstalk between signals and a delay in signal transfer rate. Such an optical waveguide is mounted for the purpose of optically coupling two or more optoelectronic devices (laser diode (light emitting element), photodiode (light receiving element), and the like) which are mounted on a multilayer wiring board.

One form of such an optical waveguide is a high polymer optical waveguide (hereinafter also simply referred to as an "optical waveguide") in which one or more cores made of a resin material are buried in a sheet-shaped cladding made of a polymer (resin) material (e.g., see Japanese Patent Publication Heisei 7-92338). At an end portion of the optical waveguide, an optical path conversion mirror is provided which can change the optical path of light traveling in the core by, for example, 90°.

As a technique of fabricating an optical waveguide having an optical path conversion mirror, methods described below has been known. In one method, an optical waveguide having an optical path conversion mirror is formed in the following manner: a groove and an inclined plane are formed in a cladding layer; resin is buried in the groove and the inclined plane to form a core having an inclined plane; and the core is covered with a cladding layer (e.g., see Japanese Patent Publication 2003-167175).

There is another method in which an optical waveguide is formed beforehand and then cut with a dicing saw to make an inclined plane serving as an optical path conversion mirror at an end portion of the optical waveguide (e.g., see Japanese Patent Publication Heisei 10-300961).

It should be noted that in one known method of processing an end face of an optical fiber, an optical fiber is cut with a heated blade (see Japanese Patent Publication Heisei 7-294748).

In the method in which a core having an inclined plane is buried in a cladding layer, a precision-machined mold is needed to form a groove and an inclined plane. Accordingly, such a method requires the manufacture of a mold and has a disadvantage that the manufacturing cost of an optical waveguide is high. Further, changing the design of the position or angle of an optical path conversion mirror requires another mold. Thus, such a method has the problem that the design of an optical path conversion mirror cannot easily be changed in terms of cost.

On the other hand, as for the method in which an optical waveguide is cut with a dicing saw to form an optical path conversion mirror, machining speed is low, and mass productivity may therefore be lowered.

SUMMARY OF THE INVENTION

An object of the present invention is to provide a method of manufacturing an optical waveguide by which an optical path conversion mirror with a desired angle can easily be formed at a desired position in the optical waveguide and which can therefore contribute to a reduction in cost.

According to one aspect of the invention, there is provided a method of manufacturing an optical waveguide having an optical path conversion mirror, including: preparing a sheet-shaped optical waveguide; and forming an optical path conversion mirror constituted of an inclined cut plane by cutting the optical waveguide with a knife blade having an inclined bevel plane, the knife blade being maintained at a temperature not lower than a glass transition point of material constituting the optical waveguide.

In the method of manufacturing an optical waveguide according to the above-described aspect, the optical waveguide is cut while the knife blade having the inclined bevel plane is heated to a temperature not lower than the glass transition point of the material constituting the optical waveguide. At this time, a portion, in contact with the bevel plane, of the optical waveguide is heated to a temperature not lower than the glass transition point to soften, and is planarized along the bevel plane. Thus, the travel of the knife blade causes an optical path conversion mirror to be formed as a planarized cut plane inclined at an angle equal to the inclination angle of the bevel plane, in a region through which the bevel plane has passed.

Thus, in the manufacture of an optical waveguide having an optical path conversion mirror, the optical path conversion mirror can easily be formed without using an expensive mold such as used in the prior art. Furthermore, manufacturing cost can be reduced. The position of formation of the optical path conversion mirror can be adjusted by changing the position where the knife blade is placed, and the angle of the optical path conversion mirror can be adjusted by changing the angle of the bevel plane of the knife blade. Accordingly, an optical waveguide having an optical conversion mirror with a desired angle at a desired position can easily be manufactured.

DESCRIPTION OF THE PREFERRED EMBODIMENTS

Hereinafter, preferred embodiments of the present invention will be described with reference to the accompanying drawings.

First Embodiment

Figure 1:
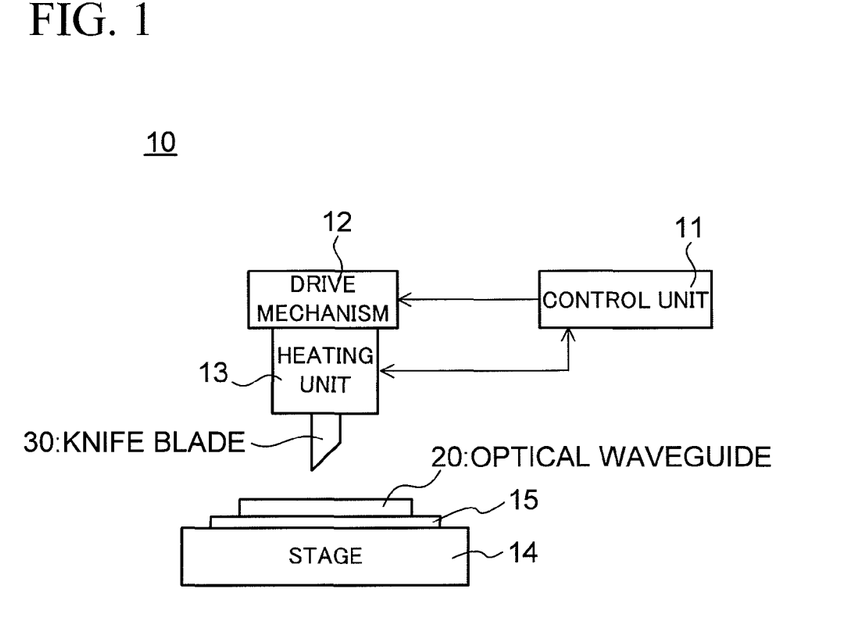
FIG. 1 is a schematic diagram showing an apparatus for use in the formation of an optical path conversion mirror according to a first embodiment.

FIG. 1 schematically shows the configuration of a machining apparatus for use in the fabrication of an optical waveguide having an optical path conversion mirror according to a first embodiment.

As shown in FIG. 1, a machining apparatus 10 for use in the first embodiment includes a control unit 11, a drive mechanism 12, a heating unit 13, a stage 14, and a knife blade 30.

The stage 14 is disposed at a position facing the drive mechanism 12, the heating unit 13, and the knife blade 30, and holds an optical waveguide 20 with a holding sheet 15 interposed therebetween. The holding sheet 15 is a resin film of, for example, polyethylene resin, polyester resin, polyimide resin, and holds the optical waveguide 20 with a removable adhesive sheet (described later) interposed therebetween. The holding sheet 15 holds the optical waveguide 20, and at the same time, protects the knife blade 30 by preventing the knife blade 30 from contacting the stage 14.

The drive mechanism 12 drives the knife blade 30 based on a control signal from the control unit 11. Further, the drive mechanism 12 can adjust the angle of the knife blade 30 as described later.

The heating unit 13 includes, for example, a heater coil. The heating unit 13 holds the knife blade 30 as well as heats the knife blade 30 using the heater coil with electricity supplied from the control unit 11. The heating unit 13 includes an unillustrated temperature sensor. Based on a signal detected by this temperature sensor, the control unit 11 performs feedback control, thus maintaining the temperature of the knife blade 30 constant. For example, in the case where the optical waveguide 20 is made of epoxy resin, the heated temperature of the knife blade 30 is maintained at approximately 140° C. to 250° C.

The control unit 11 includes, for example, a microcomputer or the like, and is intended to control the entire machining apparatus 10 including the above-described drive mechanism 12 and the heating unit 13.

Figure 2:
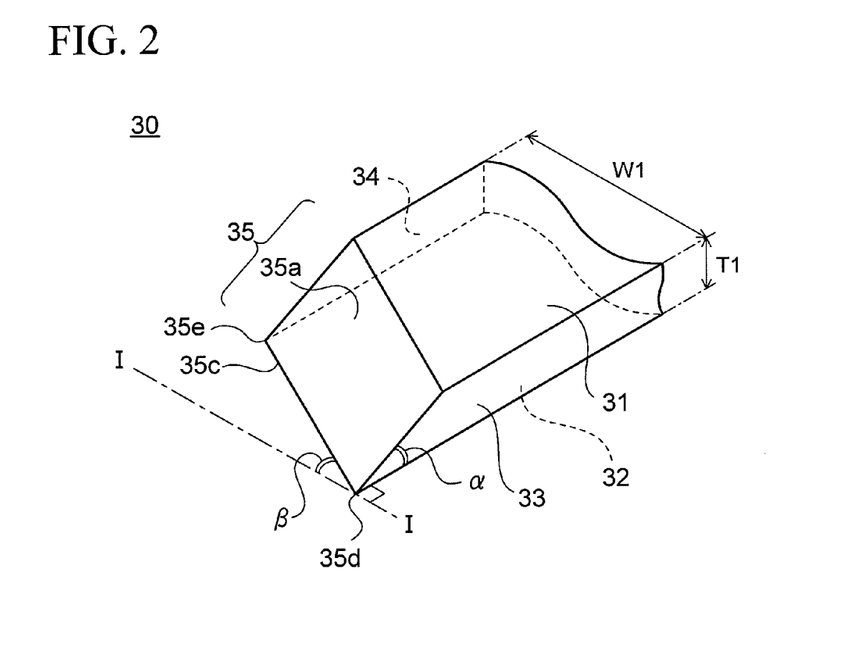
FIG. 2 is an enlarged perspective view showing a tip side of a knife blade for use in the formation of the optical path conversion mirror according to the first embodiment.

Hereinafter, the knife blade 30 will further be described with reference to FIG. 2. FIG. 2 shows an enlarged view of a tip side of the knife blade 30 for use in the formation of an optical path conversion mirror of an optical waveguide according to the first embodiment.

As shown in FIG. 2, the knife blade 30 has a front plane 31 and a back plane 32 that are parallel to each other, and side planes 33 and 34 perpendicular to the front plane 31. Further, on the front plane 31 side of a tip 35 of the knife blade 30, an inclined bevel plane 35a is formed. A tip angle α (see FIG. 2), which is formed by the bevel plane 35a and the back plane 32 of the knife blade 30, is set to 45°. At a portion where the bevel plane 35a and the back plane 32 intersect, a sharp edge 35c is formed. The edge 35c linearly extends from a trailing-side end portion 35d to a leading-side end portion 35e. It should be noted that "trailing side" refers to the backward side with respect to the direction of travel of the knife blade 30 during the operation of cutting the optical waveguide 20, and that "leading side" refers to the forward side with respect to the direction of travel of the knife blade 30 during the operation of cutting the optical waveguide 20.

The width of the knife blade 30, i.e., the length W1 from one side plane 34 to the other side plane 33, is, for example, approximately 5 mm. The thickness of the knife blade 30, i.e., the length T1 from the back plane 32 to the front plane 31, is, for example, approximately 1 mm.

In FIG. 2, line I-I is a perpendicular to the side plane 33. In this embodiment, the direction of line I-I is the same as the direction of travel of the knife blade 30 during the cutting of the optical waveguide 20. An edge inclination angle β, which is formed by the edge 35c and the direction of travel of the knife blade 30 during cutting, is set to, for example, approximately 30°.

It should be noted that the aforementioned drive mechanism 12 can change the angle of the knife blade 30 about an axis perpendicular to the front plane 31 and about an axis parallel to line I-I of FIG. 2. Thus, the drive mechanism 12 can adjust the edge inclination angle β and a bevel plane inclination angle γ, which is formed by the bevel plane 35a and the surface of the optical waveguide 20, as needed.

Figure 3:
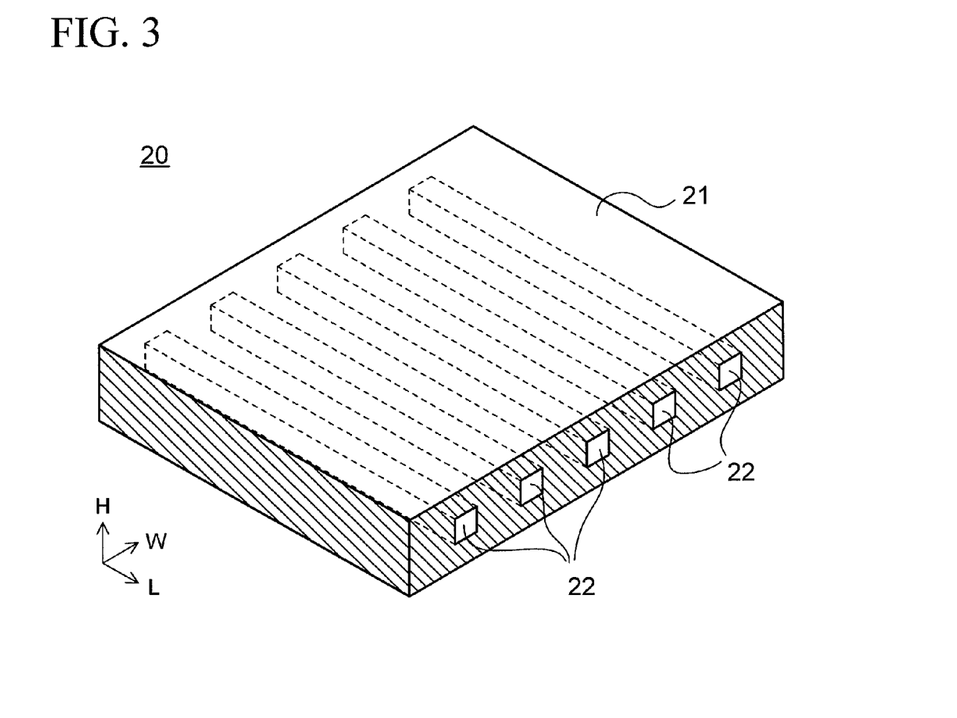
FIG. 3 is a schematic diagram showing an optical waveguide.
Figure 4:
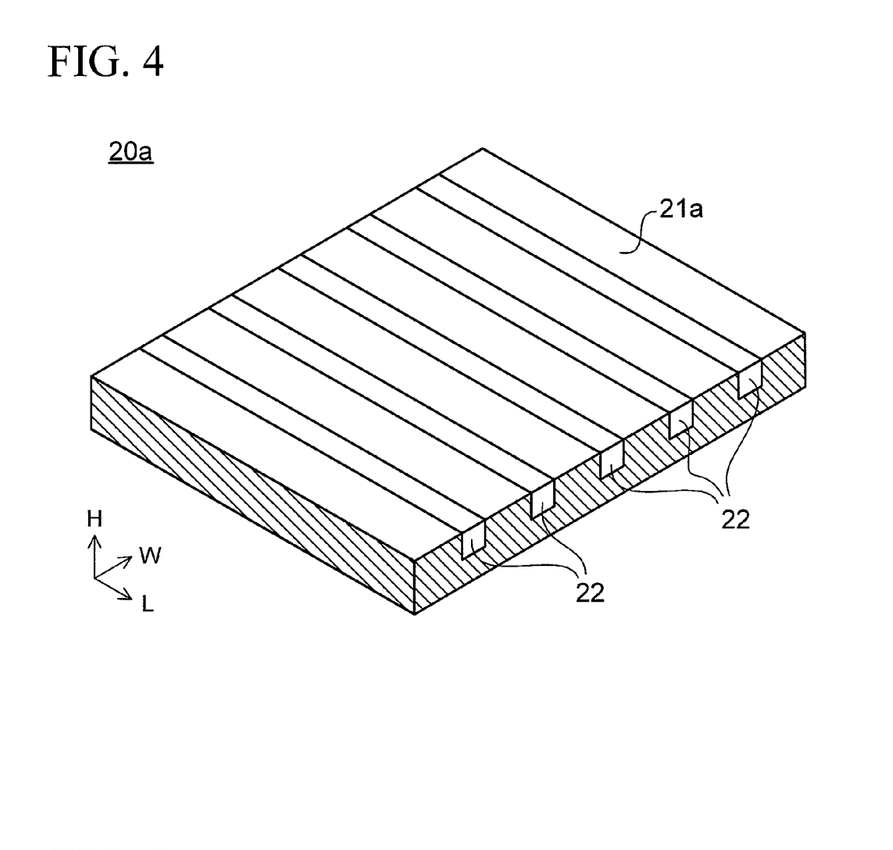
FIG. 4 is a schematic diagram showing a structure obtained in the course of manufacturing the optical waveguide.

FIG. 3 is a schematic diagram showing an optical waveguide. FIG. 4 is a schematic diagram showing a structure obtained in the course of manufacturing the optical waveguide. It should be noted that in FIGS. 3 and 4, the direction indicated by letter W is the width direction of the optical waveguide, the direction indicated by letter H is the height direction of the optical waveguide, and the direction indicated by letter L is the longitudinal direction of the optical waveguide.

As shown in FIG. 3, the optical waveguide 20 to be machined in this embodiment has a structure in which one or more cores 22 (five cores in the example shown in FIG. 3) extending in the longitudinal direction are buried in a sheet-shaped cladding 21. The cores 22 are arranged along the width direction with a pitch of, for example, approximately 250 μm. The height-direction size (thickness) of the optical waveguide 20 is set to, for example, approximately 0.1 mm to 0.5 mm.

The materials of the cladding 21 and the cores 22 may be, for example, epoxy resin. In this case, the refractive indices of the cores 22 can be made higher than that of the cladding 21 by adding an additive to the cores 22. It should be noted that the materials of the cladding 21 and the cores 22 may also be polyimide resin, polycarbonate resin, fluorinated polyimide resin, polyethylene resin, or the like instead of the above-described epoxy resin. The optical waveguide 20 can be manufactured by a technology known to those skilled in the art (e.g., see Japanese Patent Publication Heisei 7-92338).

It should be noted that instead of the optical waveguide 20 (structure in which the cores 22 are covered with the cladding 21), a structure 20a obtained in the course of manufacturing the optical waveguide 20 such as shown in FIG. 4 may be used. The structure 20a is a cladding layer 21a having the cores 22 buried in grooves thereof. The configuration of the structure 20a is similar to that of the optical waveguide 20, except for the fact that the upper portion of the structure 20a is not covered with a cladding layer 21a.

Next, a process for the formation of an optical path conversion mirror of an optical waveguide according to this embodiment will be described.

Figure 5:
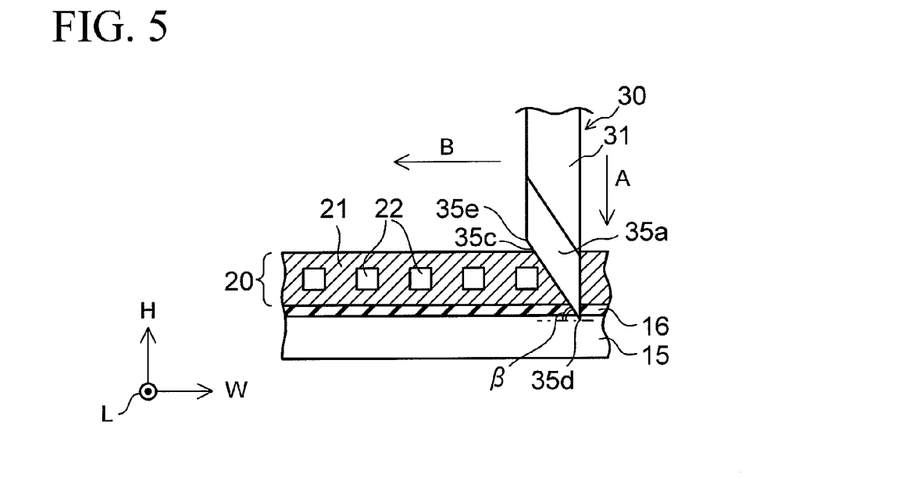
FIG. 5 is a schematic diagram showing a state in which the optical waveguide is being cut with the knife blade.
Figure 6:
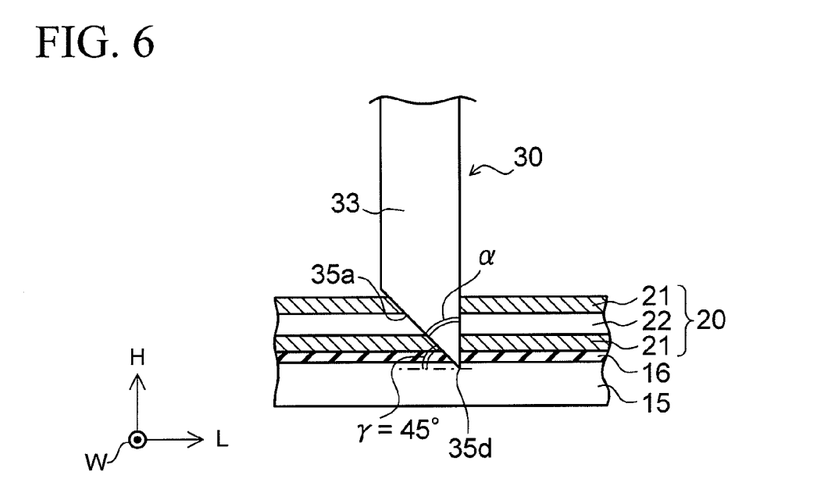
FIG. 6 is a schematic diagram showing the state shown in FIG. 5 when viewed from the side of one side plane of the knife blade.
Figure 7:
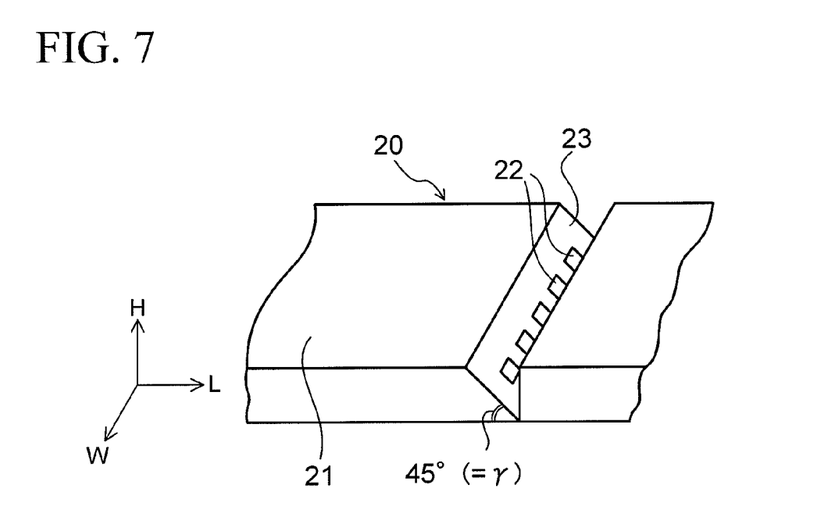
FIG. 7 is a perspective view showing the optical waveguide cut with the knife blade.

FIG. 5 schematically shows a state in which the optical waveguide 20 is being cut with the knife blade 30. FIG. 6 schematically shows the state shown in FIG. 5 when viewed from the side of the side plane 33 of the knife blade 30. FIG. 7 shows the optical waveguide 20 cut with the knife blade 30. It should be noted that in FIGS. 5 to 7, the direction indicated by letter W is the width direction of the optical waveguide 20, the direction indicated by letter H is the height direction of the optical waveguide 20, and the direction indicated by letter L is the longitudinal direction of the optical waveguide 20.

First, the optical waveguide 20 manufactured by a known technique as described above is prepared and fixed on the holding sheet 15 with the adhesive sheet 16 interposed therebetween as shown in FIG. 5. It should be noted that the adhesive sheet 16 has low adhesiveness, so that the optical waveguide 20 can easily be removed from the holding sheet 15.

Next, the holding sheet 15 having the optical waveguide 20 fixed thereon is mounted on the stage 14 of the machining apparatus 10.

Subsequently, based on the control by the control unit 11, the knife blade 30 is heated using the heating unit 13 to a temperature (e.g., approximately 180° C.) not lower than the glass transition point of the material constituting the optical waveguide 20. After this, during a state for cutting the optical waveguide 20, the temperature of the tip end of the knife blade 30 is maintained at a temperature not lower than the glass transition point of the material constituting the optical waveguide 20.

After that, the knife blade 30 is moved to above a position in the optical waveguide 20 where an optical path conversion mirror is to be formed. Then, by lowering the knife blade 30 as indicated by arrow A in a state in which the front and back planes 31 and 32 and the side planes 33 and 34 of the knife blade 30 are held perpendicular to the surface of the optical waveguide 20, a portion near the trailing-side end portion 35d of the knife blade 30 is stuck into the optical waveguide 20 and the holding sheet 15. At this time, the angle (bevel plane inclination angle) γ formed by the bevel plane 35a of the knife blade 30 and the surface of the optical waveguide 20 is set to 45° as shown in FIG. 6.

It should be noted that the lowering of the knife blade 30 which is indicated by arrow A in FIG. 5 is preferably performed over a region (e.g., a region near an end portion) of the optical waveguide 20 where the cores 22 do not exist in order to prevent the cores 22 from being broken.

Next, as indicated by arrow B in FIG. 5, the knife blade 30 is moved in the direction perpendicular to the longitudinal direction (direction of travel of light traveling in the cores 22) of the optical waveguide 20 to cut the optical waveguide 20. At this time, a portion, in contact with the bevel plane 35a, of the optical waveguide 20 is heated to a temperature not lower than the glass transition point to soften, thus being planarized along the bevel plane 35a. Further, the travel of the knife blade 30 causes a planarized cut plane (optical path conversion mirror) 23 inclined at an angle (45°) equal to the bevel plane inclination angle γ as shown in FIG. 7 to be formed in a region through which the bevel plane 35a has passed.

In the cutting of the optical waveguide 20, it is considered that very small irregularities are generated in the cut plane in the case where the travelling speed of the knife blade 30 is too slow or too fast. In such cases, sufficient reflectance for the optical path conversion mirror 23 cannot be obtained. Accordingly, in this embodiment, the travelling speed of the knife blade 30 is set to 0.1 mm/s to 50 mm/s. This makes it possible to form the planarized optical path conversion mirror 23 in the optical waveguide.

By the above-described steps, the optical waveguide 20 having the optical path conversion mirror 23 is manufactured. It should be noted that for the purpose of improving the reflectance of the optical path conversion mirror 23, an additional process may be performed to form a multilayer dielectric film, a reflective metal film, or the like on the surface of the optical path conversion mirror 23.

Figure 8A:
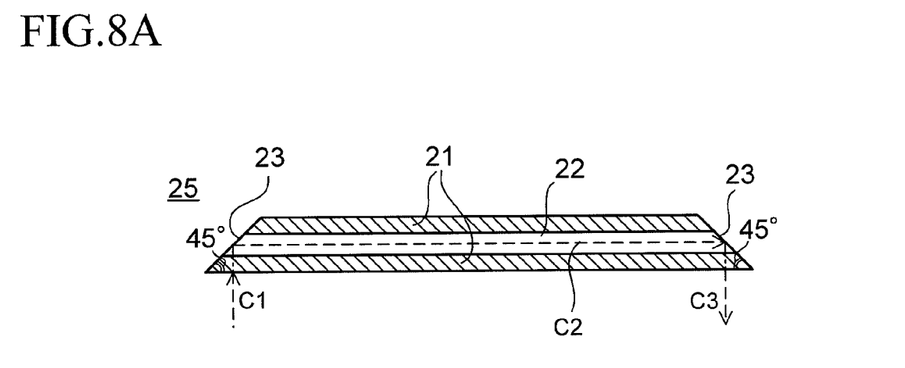
FIGS. 8A and 8B are a cross-sectional view and a top view showing an optical waveguide having optical path conversion mirrors according to the first embodiment.
Figure 8B:
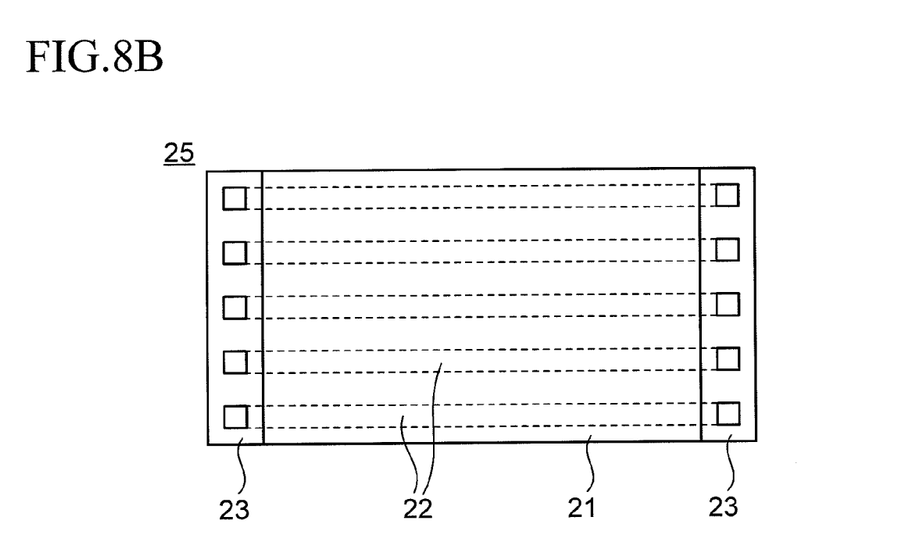

FIG. 8A shows a cross section of an optical waveguide having optical path conversion mirrors according to the first embodiment. FIG. 8B shows the optical waveguide having the optical path conversion mirrors according to the first embodiment from the upper surface side.

As shown in FIGS. 8A and 8B, an optical waveguide 25 has the optical path conversion mirrors 23 at both end portions, respectively. The optical waveguide 25 can be manufactured by performing a cutting operation twice using the knife blade 30 such as described above: once on one of different portions (both end portions) of the optical waveguide 20, and once on the other.

Each of the optical path conversion mirrors 23 of the optical waveguide 25 is inclined at 45° with respect to the lower surface thereof, and changes the optical path of light traveling in the core 22 or entering at the lower surface of the optical waveguide 25 by 90°. Accordingly, the optical waveguide 25 can guide light incident thereon, for example, as indicated by arrow C1, as indicated by arrows C2 and C3.

Figure 9:
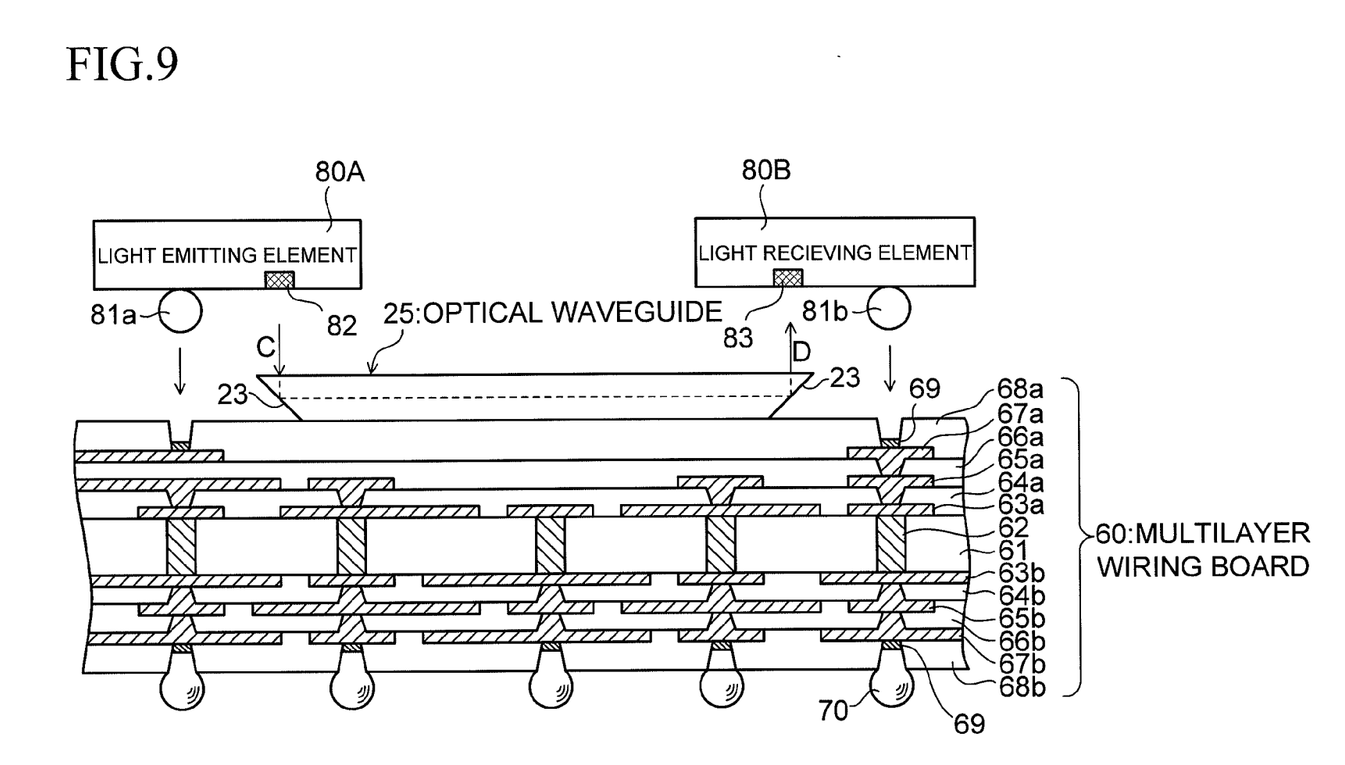
FIG. 9 is a cross-sectional view showing an example in which the optical waveguide having the optical path conversion mirrors according to the first embodiment is mounted on a multilayer wiring board.

FIG. 9 shows one example of a multilayer wiring board on which an optical waveguide according to the first embodiment is mounted.

In a multilayer wiring board 60 shown in FIG. 9, reference numeral 61 denotes an insulating base (e.g., glass epoxy resin) as core material for the multilayer wiring board 60, and reference numeral 62 denotes a conductor (as a representative example, copper (Cu)) which fills in through-holes formed at desired positions in the insulating base 61. Reference numerals 63a and 63b denote wiring layers (Cu) which are formed on both surfaces of the insulating base 61 by patterning, respectively. Reference numerals 64a and 64b denote resin layers (as a representative example, epoxy resin) which are formed on the insulating base 61 and the wiring layers 63a and 63b, respectively. Reference numerals 65a and 65b denote wiring layers (Cu) which are formed on the resin layers 64a and 64b by patterning and electrically connected to the wiring layers 63a and 63b through vias at desired positions, respectively.

Moreover, reference numerals 66a and 66b denote resin layers (epoxy resin) which are formed on the resin layers 64a and 64b and the wiring layers 65a and 65b, respectively. Reference numerals 67a and 67b denote wiring layers (Cu) which are formed on the resin layers 66a and 66b by patterning and electrically connected to the wiring layers 65a and 65b through vias at desired positions, respectively. Reference numerals 68a and 68b denote solder resist layers as protection films formed on the resin layers 66a and 66b and the wiring layers 67a and 67b, respectively.

In predetermined portions of the solder resist layers 68a and 68b, openings are formed. On pads (wiring layers 67a and 67b) exposed through the openings, nickel/gold (Ni/Au) plating films 69 are formed. Reference numeral 70 denotes a solder bump as an external connection terminal for use in mounting the multilayer wiring board 60 on a packaging board such as a motherboard.

As shown in FIG. 9, the optical waveguide 25 of this embodiment is mounted at a predetermined position on the solder resist layer 68a with the inclined plane 23 facing down. At that time, the mounting is performed using an adhesive sheet (not shown) made of thermosetting resin, ultraviolet curing resin, or the like. On the side of one end of the optical waveguide 25, a light emitting element 80A including a laser diode 82 is mounted. On the side of the other end of the optical waveguide 25, a light receiving element 80B including a photodiode 83 is mounted. It should be noted that the light emitting element 80A and the light receiving element 80B have electrode terminals 81a and 81b bonded to the nickel/gold plating films 69 through solder or the like, respectively. This ensures the electrical connection between the light emitting element 80A, the light receiving element 80B, and the multilayer wiring board 60.

The optical waveguide 25 is mounted in the state of being aligned so that the laser diode 82 and the photodiode 83 may be located over the optical path conversion mirrors 23 at both ends, respectively. Accordingly, an optical signal from the laser diode 82 is made incident on one end of the optical waveguide 25 as indicated by arrow C. The optical signal made incident on the optical waveguide 25 is guided to the inside of the core 22 by the optical path conversion mirror 23, and further reflected by the optical path conversion mirror 23 at the other end, thus being guided upward as indicated by arrow D to be transmitted to the photodiode 83. Thus, the light emitting element 80A and the light receiving element 80B are optically coupled through the optical waveguide 25.

As described above, according to this embodiment, the optical waveguide 20 is cut while the knife blade 30 having the inclined bevel plane 35a is being heated. At this time, a portion, in contact with the bevel plane 35a, of the optical waveguide 20 is heated to a temperature not lower than the glass transition point to soften, thus being planarized along the bevel plane 35a. Further, the travel of the knife blade 30 causes a planarized cut plane (optical path conversion mirror) 23 to be formed in a region through which the bevel plane 35a has passed, the planarized cut plane 23 being inclined at an angle (45°) equal to the bevel plane inclination angle γ.

Thus, in the manufacture of an optical waveguide having optical path conversion mirrors, the optical path conversion mirrors can easily be formed without using an expensive mold such as used in the prior art (Japanese Patent Publication 2003-167175). Furthermore, manufacturing cost can be reduced.

Second Embodiment

Figure 10:
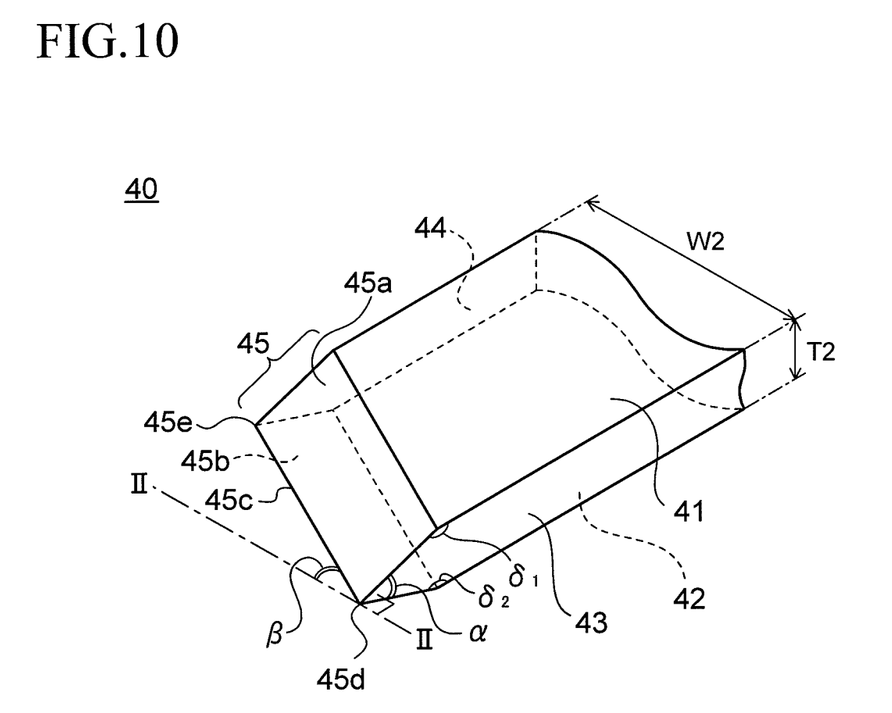
FIG. 10 is a perspective view showing a knife blade for use in a second embodiment.

Hereinafter, a second embodiment will be described with reference to FIGS. 10 to 12. FIG. 10 shows a knife blade according to the second embodiment.

In this embodiment, optical path conversion mirrors are formed using a knife blade 40 shown in FIG. 10 instead of the knife blade 30 of the first embodiment. It should be noted that components of the machining apparatus 10 other than the knife blade 40 and processes for the formation of the optical waveguide 20 and the optical path conversion mirrors are similar to those of the first embodiment and will not be further described.

As shown in FIG. 10, the knife blade 40 of this embodiment has a two-beveled tip 45. Specifically, the knife blade 40 has a front plane 41 and a back plane 42 that are parallel to each other, and side planes 43 and 44 perpendicular to the front plane 41. Further, an inclined bevel plane 45a is formed on the front plane 41 side of the tip 45, and an inclined bevel plane 45b is formed on the back plane 42 side thereof.

The angle $\delta_1$ between the front plane 41 and the bevel plane 45a and the angle $\delta_2$ between the back plane 42 and the bevel plane 45b are both 135°. The tip angle α is 90°. The width W2 of the knife blade 40 is, for example, approximately 5 mm, and the thickness T2 thereof is, for example, approximately 2 mm.

In FIG. 10, line II-II is the perpendicular to the side plane 43. In this embodiment, the direction of line II-II is the same as the direction of travel of the knife blade 40 during the cutting of the optical waveguide 20. At a portion of the tip 45 where the bevel plane 45a and the bevel plane 45b intersect, an edge 45c is formed. The edge 45c linearly extends from a trailing-side end portion 45d to a leading-side end portion 45e, and is inclined at, for example, 30° with respect to line II-II. Accordingly, the optical waveguide 20 can continue being cut smoothly.

Figure 11:
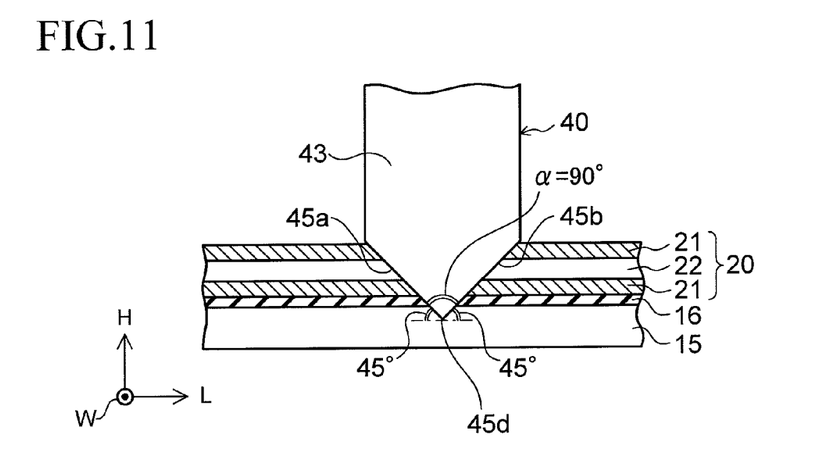
FIG. 11 is a schematic diagram showing a state in which an optical waveguide is being cut with the knife blade for use in the second embodiment.
Figure 12:
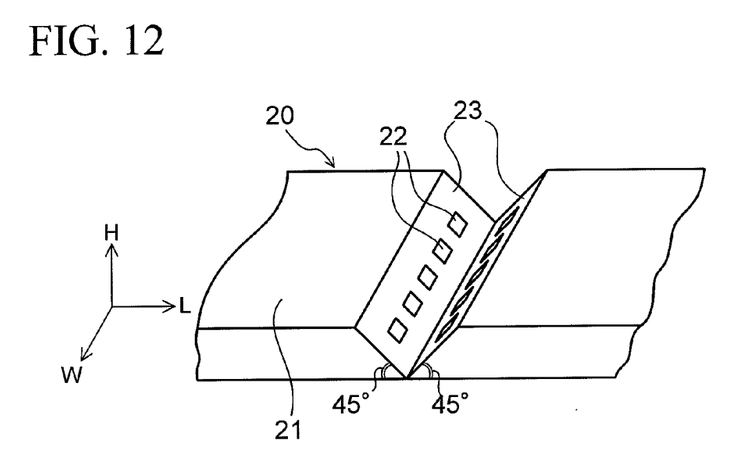
FIG. 12 is a perspective view showing the optical waveguide cut with the knife blade for use in the second embodiment.

FIG. 11 schematically shows a state in which the optical waveguide 20 is being cut with the knife blade 40 according to the second embodiment. FIG. 12 shows the optical waveguide 20 cut with the knife blade 40 according to the second embodiment.

As shown in FIG. 11, in this embodiment, the optical waveguide 20 is cut while the front, back, and side planes 41, 42, 43 and 44 of the knife blade 40 are being held perpendicular to the surface of the optical waveguide 20. At this time, the bevel planes 45a and 45b of the knife blade 40 are in contact with the surface of the optical waveguide 20, in the state of being inclined at 45° with respect thereto as shown in FIG. 11. Thus, by moving the knife blade 40, the optical path conversion mirror 23 can be formed as a cut plane inclined at 45° with respect to the surface of the optical waveguide 20 as shown in FIG. 12. It should be noted that the travelling speed of the knife blade 40 during the cutting of the optical waveguide 20 can be set to 0.1 mm/s to 50 mm/s.

As described above, in the second embodiment, though the two-beveled knife blade 40 is used, the optical path conversion mirrors 23 can easily be formed in the optical waveguide 20 by an effect similar to that of the first embodiment. Further, the second embodiment contributes to a reduction in manufacturing cost.

Variation of Second Embodiment

Figure 13:
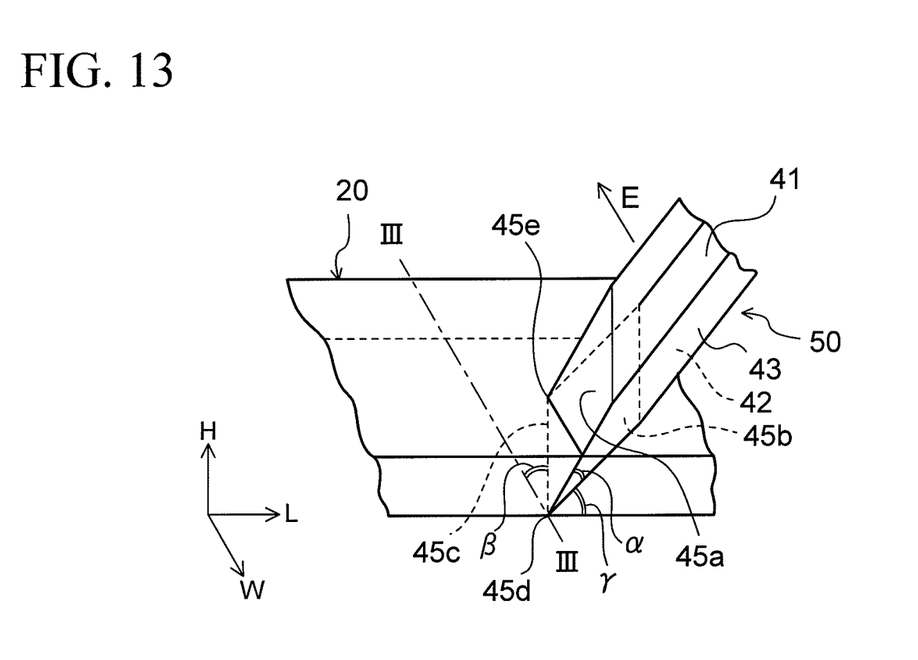
FIG. 13 is a perspective view showing a state in which an optical waveguide is being cut with a knife blade for use in a variation of the second embodiment.

FIG. 13 shows a state in which the optical waveguide 20 is being cut with a knife blade according to a variation of the second embodiment.

In this variation, a knife blade 50 is used instead of the knife blade 40. As shown in FIG. 13, the knife blade 50 is the same as the knife blade 40 of the second embodiment, except for the fact that the knife blade 50 is shaped so that the tip angle α may be 5° to 45°.

The angle (bevel plane inclination angle) γ, which is formed by the bevel plane 45b of the knife blade 50 and the surface of the optical waveguide 20, is adjusted with the drive mechanism 12 of the machining apparatus 10 (see FIG. 1). Specifically, the bevel plane inclination angle γ is not limited to 45° but may be a desired angle in the range of 0°<γ<90°. Further, the angle (edge inclination angle) β between the direction (line of travel of the knife blade 50 during cutting and the edge 45c is appropriately set in the range of $0°<\beta<60°$ by the drive mechanism 12.

Thus, in this embodiment, an optical path conversion mirror can easily be formed which is constituted of a cut plane inclined at a desired angle more than 0° and less than 90° with respect to the surface of the optical waveguide 20. Further, as in the aforementioned first and second embodiments, a desired optical path conversion mirror can be formed without using an expensive mold. Accordingly, this embodiment contributes to a reduction in manufacturing cost.

What is claimed is:

1. A method of manufacturing an optical waveguide having an optical path conversion mirror, comprising:
   preparing a sheet-shaped optical waveguide made of a polymer material; and
   forming an optical path conversion mirror constituted of an inclined cut plane by cutting the optical waveguide with a knife blade having a leading edge of the knife blade inclined along the direction of travel during the cutting step, the knife blade having a bevel plane a side of which is the leading edge and a height of which is higher than a thickness of the optical waveguide when the knife blade is stuck into the optical waveguide through the entire thickness thereof while the knife blade is held perpendicularly to a surface of the optical waveguide, and being maintained at a temperature not lower than a glass transition point of material constituting the optical waveguide.

2. A method of manufacturing an optical waveguide, according to claim 1, wherein the optical path conversion mirror is formed by cutting the optical waveguide while moving the knife blade in a direction perpendicular to a longitudinal direction of the optical waveguide.

3. A method of manufacturing an optical waveguide, according to claim 2, wherein the optical waveguide is cut with the knife blade by sticking the knife blade into the optical waveguide through the entire thickness thereof without contacting the core and then moving the knife blade in a direction perpendicular to a longitudinal direction of the core.

4. A method of manufacturing an optical waveguide, according to claim 1, wherein the optical path conversion mirror is formed at such an angle that an optical path of light traveling in a core of the optical waveguide is changed by 90°.

5. A method of manufacturing an optical waveguide, according to claim 1, wherein the optical waveguide is made of a high polymer material selected from the group consisting of epoxy resin, polyimide resin, polycarbonate resin, fluorinated polyimide resin, and polyethylene resin.

\* \* \* \* \*